United States Patent [19]

Anderson

[11] Patent Number: 4,673,227

[45] Date of Patent: Jun. 16, 1987

[54] ENCLOSURE CABINET FOR OUTDOOR-USE DEVICES

[76] Inventor: Daryl R. Anderson, E. Main St., Crawfordsville, Ind. 47933

[21] Appl. No.: 782,478

[22] Filed: Oct. 1, 1985

[51] Int. Cl.⁴ .............................................. A47B 81/00
[52] U.S. Cl. ...................................... 312/100; 248/89; 312/280; 242/86; 242/106
[58] Field of Search ............... 312/100, 229, 228, 237, 312/245, 266, 267, 280, 284; 248/89; 242/86, 86.1, 106; 296/136

[56] References Cited

U.S. PATENT DOCUMENTS

| | | | |
|---|---|---|---|
| 2,334,141 | 11/1943 | Zierden | 242/86 |
| 2,555,671 | 6/1951 | Baia | 242/106 |
| 3,698,656 | 10/1972 | Ballenger | 242/86 |
| 4,348,790 | 9/1982 | Kuramoto et al. | 24/609 |

FOREIGN PATENT DOCUMENTS 643994  9/1928  France .......................... 52/DIG. 14

Primary Examiner—Kenneth J. Dorner
Assistant Examiner—Joseph Falk
Attorney, Agent, or Firm—Robert A. Spray

[57] ABSTRACT

An enclosure cabinet which provides covered storage for a lawn mower or the like even with the handle remaining assembled onto the mobile unit, but not nearly as large as would be needed by a unitary shape large enough to accommodate the handle without disassembly. The walls also carry a removable hose basket, with easy means of mounting and dismounting, including a latch-like device for maintaining the mounted condition of the hose basket.

10 Claims, 8 Drawing Figures

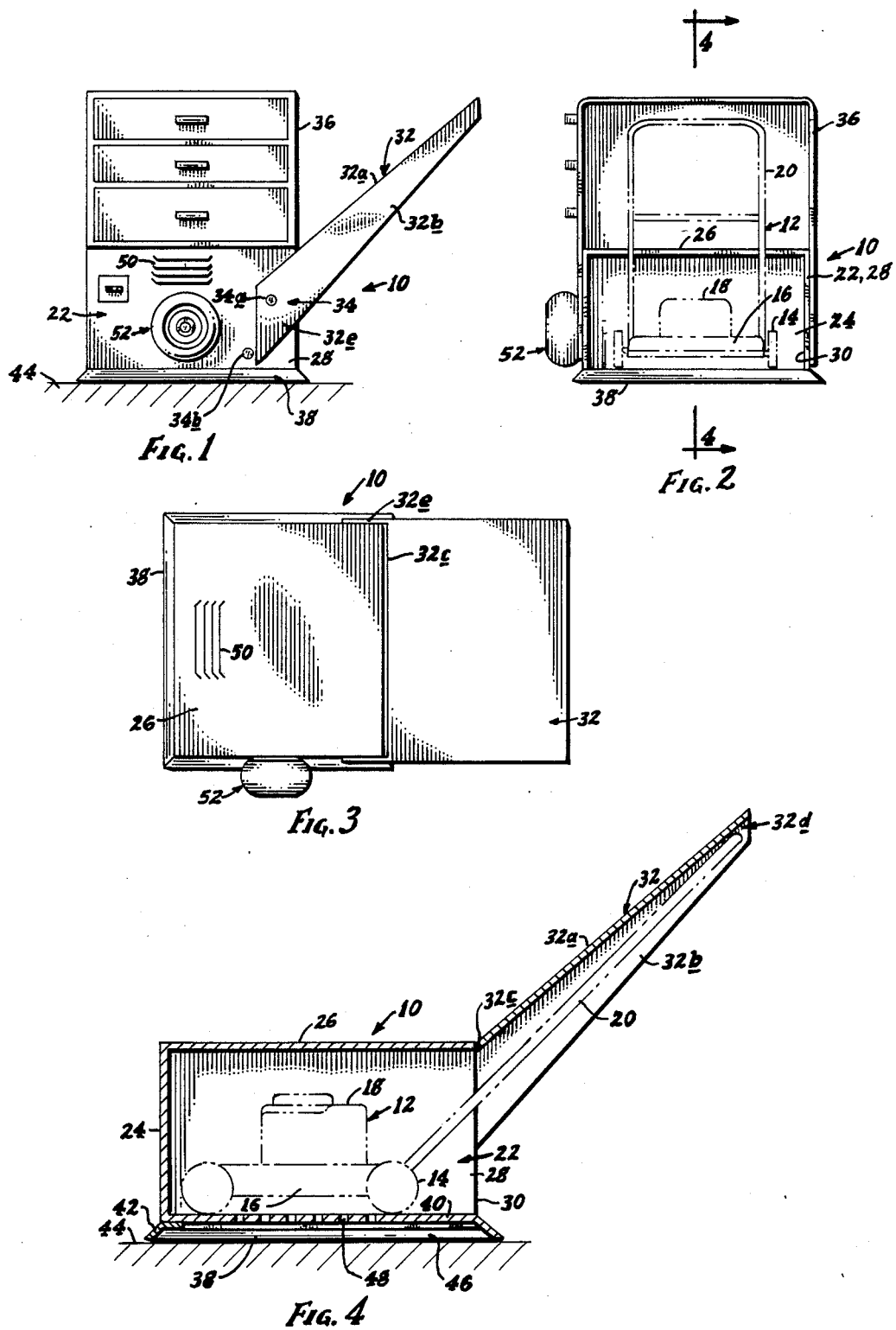

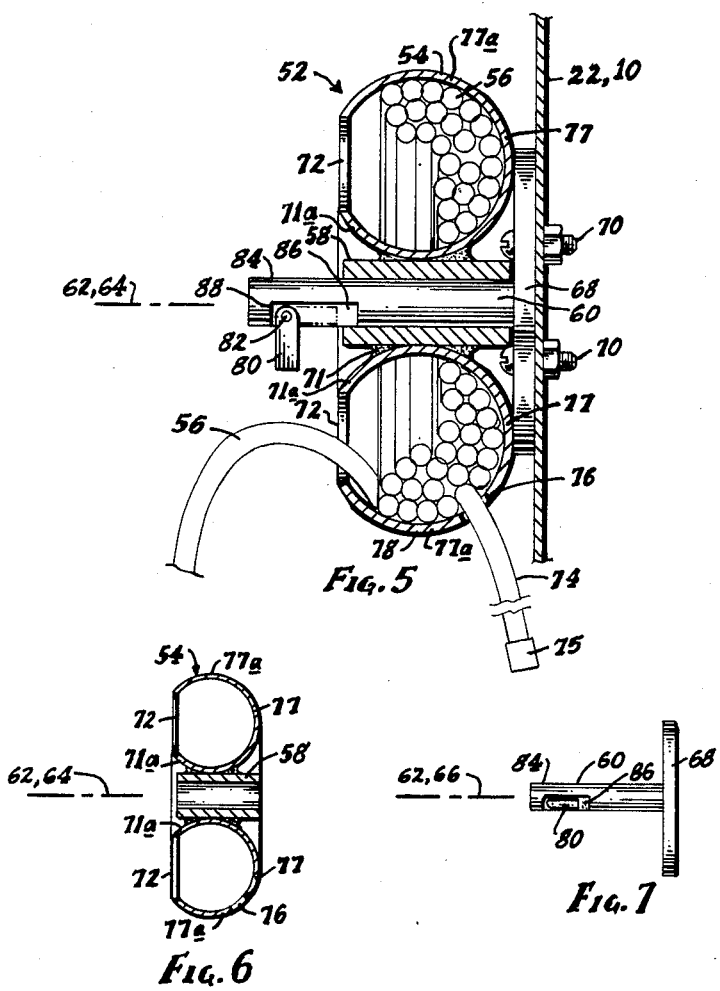
Fig. 5
Fig. 6
Fig. 7
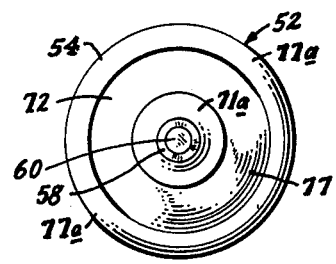
Fig. 8

ENCLOSURE CABINET FOR OUTDOOR-USE DEVICES

BACKGROUND OF THE INVENTION

The present invention relates to storage of an outdoor-use device, and more particularly devices often awkward to store, or which take up more space than what is often conveniently available.

One type of such device is a power lawn mower, or a similarly shaped snow blower or the like, for they necessarily have long and awkwardly-protruding handles; and for convenient storage and re-use it is desired that the handles not be disassembled from the power unit and other mobile parts. Thus a considerable amount of volume and floor area of storage is required by storage of this type of article, even though much of that storage volume is in effect wasted, due to the awkwardness of shape of such a device with an assembled handle.

Furthermore, storage is difficult because such devices are quite heavy, and thus they post problems of manipulation for storage, and their weight and awkwardness means that they can not usually be given any elevated or wall-mounted storage.

Another outdoor-use article which presents awkward or difficult storage problems is a garden hose, for it is usually of a desirably long length, and it has inherent stiffness; and thus even if a coiling storage is attempted, it is not always satisfactory, and even if coiled after use, it is not convenient to transport the hose in fully coiled condition to a storage area.

Moreover, even if the coiled bundle of hose is transported to a storage area, its nature causes it to often become uncoiled, and thus quite disorderly of sight and requiring extra floor area for storage; and if it is attempted to be hung as a coil, a disorderly sight also occurs as the hose coils loosen and often present an awkwardly-hanging appearance.

BRIEF SUMMARY OF THE INVENTION

Storage for a power lawn mower or the like is provided by a cabinet only as large as the power unit and other mobile components, not including the handle. On the front of the cabinet there is provided a handle cover pivotally connected to the cabinet side walls. An ancillary storage chamber, which preferably has drawers, is carried on top of the cabinet for further storage, such as accessories, cleaning equipment, and/or tools for the device.

The wall of the cabinet is provided with a basket-like component for receiving a coil of garden hose; and the component is removable for carry of the hose in coiled condition between the mounting place and the place or places for the hose to be used. Easy connection and removal means are providing, including a latching device which securely holds the basket-like component to its mounting, yet permits ease of removal and re-mounting.

BRIEF DESCRIPTION OF THE DRAWINGS

The above description is generally of introductory nature; and more particular details, features, and concepts will be further apparent from the following more-detailed description of an embodiment illustrating the inventive concepts, considered with the accompanying drawings. In the drawings, which are somewhat schematic or diagrammatic for illustrating the concepts, the various Figures of the drawings are as follows:

FIG. 1 is a side elevation view of an enclosure cabinet for storage of a power lawn mower and garden hose, being an embodiment including a supplemental storage compartment or cabinent, according to concepts of an embodiment of the present invention;

FIG. 2 is a front elevation view thereof, a handle cover component removed to avoid obsuring interior details, and chain lines indicating a power lawn mower stored therein, and with drawers and drawer-supports of the supplemental cabinet having been omitted;

FIG. 3 is a top view of the cabinet and supplemental drawer or storage cabinet assembly of FIG. 1;

FIG. 4, in larger scale, is a vertical cross-sectional view taken generally as shown by Section-line 4—4 of FIG. 2, although the supplemental storage cabinet or drawers component is omitted;

FIG. 5, in enlarged scale compared to that of FIGS. 1–4, is a vertical cross-sectional view of the garden hose storage rack shown in FIGS. 1–3, as supported by a mounting frame mounted on a wall of the enclosure cabinet, and carrying a long length of garden hose as stored therein;

FIG. 6, on a smaller scale as are all of the FIGS. 6–8 in comparison to FIG. 5, is vertical cross-sectional view of the hose storage rack component of FIG. 5;

FIG. 7 is a side elevational view of the mounting frame component of FIG. 5; and FIG. 8 is a front elevation view of the hose storage rack of FIGS. 5 and 6.

DESCRIPTION OF THE PREFERRED EMBODIMENT

As shown in the drawings, the present invention provides advantageously an enclosure cabinet 10 for orderly storage of a lawn device such as a power lawn mower 12 or snow blower which are usually of an awkward shape as to storage, and whose awkwardness includes the size and other characteristics of their ground-engaging wheels 14, their cutting or other operational means 16, their power means 18, and the particularly awkwardly-protruding handle 20.

As shown, the enclosure cabinet 10 includes a pair of side walls 22, a rear wall 24 which interconnects the rear end portions of the side walls 22, and a cover means 26 which extend between the side walls 22 and to the rear wall 24.

The front end portions 28 of the side walls 22 are shown as provided with a full opening 30 between them, wide enought for permitting the ingress and egress of all the lawn mower components 14,16,18, and the lower portion of the handle 20 through the opening 30 between the side walls 22 for the desired storage of the lawn device, without any need of disassembly thereof.

The invention is also shown as provided with a handle cover 32 for shielding the handle 20 of the lawn mower device 12, and support means 34 which support the handle cover 32 from the enclosure cabinet 10 in the position of assembly of a lawn device handle 20 to a lawn device, i.e., in a position extending upwardly and forwardly from the cabinet 10.

Thus, the arrangement of the enclosure cabinet 10 and the handle cover 32 provides an overall shielding enclosure for the lawn mower's components 14–18 including its handle 20 while the handle 20 is operatively assembled to the said set of components, and no disassembly is required.

More particularly as shown, the handle cover 32 and its support means 34 are such that the handle cover 32 is movable, with respect to the said enclosure cabinet 10, in a manner permitting the user to move the handle cover 32 relatively upwardly of the lawn mower handle 20 even though the lawn mower 12 be moved fully into the enclosure cabinet 10 and with the handle cover 32 then resting on the lawn mower handle 20; and this thereby gives the user manual access to the lawn mower handle 20 even at such relative position in which the lawn mower 12 is stored in the enclosure cabinet 10, and the handle cover 32 is covering the device's handle 20.

The handle cover 32 (noting especially FIG. 4) is shown formed from desirably metal or plastic into an inverted trough-like body, of inverted U-shape in cross-section, having an upper wall 32a and side walls 32b, the open bottom of which permits it to be operatively fully covering the handle 20. The top wall 32a of cover 32 is cut back to a line 32c for enough to let the handle cover 32 be raised high enough to give ample clearance (32d, FIG. 4), but not unduly far as to give more than a minimal openness to the cover wall 32a adjacent the cabinet 10; and this cutback (32c of cover top-wall 32a) leaves the lower portion 32e of the cover sidewalls 32b straddling the cabinet 10 for connection thereto now particularized.

For supportive connection to the cabient 10, the handle's cover member 32, in the regions 32e of sidewalls 32b, is shown (FIG. 1) as pivotally connected by a pin 34a to the cabinet side wall 22 at each side of the cabinet 10; and there is shown an abutment lug 34b fixed onto the cabinet sidewalls 22, spaced from the pin 34a, and adapted to engage the end of the handle cover's sidewall portions 32e, to support the handle cover 32 in its upraised condition, providing storage access to the device handle and even with some clearance noted at 32d.

The embodiment provides an ancillary storage compartment means 36 supportable on the basic enclosure cabinet 10.

Desirably as shown there is provided for the cabinet 10 a base panel means 38; and the side walls 22 and the rear wall 24 are supported on the base panel means 38.

Further (noting particularly FIG. 4), the base panel means 38 is provided as a generally horizontal panel 40, and there is a supporting flange 42 extending peripherally along the edge of the panel 40, and this provides that when the device 10 is resting on the ground 44 its supporting flange 42 will engage the ground 44 and hold the base panel means above the ground, leaving some air space 46; and vents or drain openings 48 in the base panel 40 permit drainage, etc.

Also, there are vent openings 50 provided in the walls of the enclosure cabinet 10, and of the ancillary storage cabinet 36; and the vents provide desired venting of gasoline fumes, or fumes such as gasoline and/or oil, from the stored lawn device, of from its cleaning rags or tools, etc.

The overall utility of the storage cabinet 10 is considerably enhanced by using its outdoor location, and its conveniently usable walls, for providing a mounting for a garden hose storage rack 52, as shown in FIGS. 5-8.

As there shown, there is provided a basket-like supportive frame means 54 large enough to receive a large coil of garden hose 56, and generally shown as being of a toroidal shape to receive the hose 56.

Two connector means are provded; i.e., the supportive frame means 54 has a first connector means 58, and it is adapted to co-operate with an associated second connector means 60 which is fixed to an associated support mounting for supporting the frame 54. Here the associated support mounting is a sidewall 22 of the enclosure cabinet 10.

For noting the use of the rack 52, the description will be begun as in FIG. 5, with the hose 56 already coiled in place, i.e., using the supportive frame means as a basket adapted to have removably received a coil 56 of garden hose for orderly storage. As shown in FIG. 5, the rack is shown mounted on the cabinet sidewall 22.

It will be noted that the first connector means 58 and the second connector means 60 are co-operative such that the second connector means 60 provides a supporting mount for the first connector means 58 when the rack 52, including of course the first connector means 58 and its supportive frame or basket means 54, are moved to such a hanging or storage-mounted condition by interconnecting the first connector means 58 and the second connector means 60 into an assembly, as per FIG. 5.

For use of the garden hose, removal from the storage-mount condition merely requires easy disassembly of the first connector means 58 and the second connector means 60 from the assembly, for whatever optional movement of the rack 52 is desired.

Subsequent use of the rack 52 in receiving back the hose 56 for subsequent storage will be described with the description particulars of the storage frame 54.

Thus, noticing FIGS. 5 and 6, it will be noted in the illustrative embodiment that the first connector means 58 is tubular and its axis 62 is generally concentric with the axis 64 of the supportive frame means 54 itself, providing that the garden hose 56 may be coiled about the axis 62 of the first connector means 58 when the supportive frame means 54 is receiving the garden hose 56 for storage.

Further, as shown the second connector means 60 is shown to be a shaft or pin member, and the assembly of the garden hose storage rack 52 onto the second connector means 60 is by a telescoping reception of the pin member 60 and the tubular member 58. The pin 60, whose axis is shown as 66, is held (by means not shown) onto a support mounting plate 68; and the pin 60 and plate 68, as an assembly, are shown connected as by bolts 70 to the sidewall 22 of the cabinet 10.

The connector tube 58 is shown affixed to the frame 54 by welds 71; and it will be noted that the tube 58 and/or the adjacent inner portion 71a of the frame 54 extends significantly into the space on the side of the supportive frame 54 which receives the garden hose 56 that the tubular member 58 or frame-portion 71a provides an axis around which the user is encouraged to coil the garden hose 56 when placing it into the supportive frame means 54 for storage.

Usually the re-use of the rack 52 for accepting a storage of hose 56 will be while the rack 52 is laying 90° from its FIG. 5 position; and the open face 72, of ring-like shape, of the frame 54, accepts the hose 56 in what in that position of the rack 52 will be horizontal coils. (A short tail-section 74 of the hose 56, having the female fitting 75 for attachment onto the dispensing hydrant or faucet (not shown) will conveniently always be protruding from an opening 76 in the wall of the frame 54.)

In the basket-like toroidal shape of the supportive frame means 54, it is noted as having a central portion 77 and outer portions 77a extending generally perpendicularly therefrom; and in this preferred form it provides, when the supportive frame means 54 is resting on the ground after disassembly of the first connector means 58 and the second connector means 60 and removal of the frame 54 from the associated support mounting, that the central portion 77 provides a support upon which may rest the coil of the garden hose 56 received by the supportive frame means 54 and providing also that the outer portions 77a provide a confining sidewall for the garden hose 56 to urge it to assume a generally coiled shape as it is being received by the supportive frame means 54.

After the re-coiling has been done, the rack 52 is re-installed onto the support pin 60 as per the FIG. 5 condition.

Preferably as noted the supportive frame means 54 has a basket-like wall, of fully generally toroid shape, except for the ring-shaped hose-receiving opening 72; but at least the portion 78 of the frame 54 which when the rack 52 is hanging in its mounted or FIG. 5 position (the first connector means 58 and the second connector means 60 are assembled) will be lowermost, is provided to be a leg means extending outwardly from the supportive frame means 54 for providing a support for any portion of the garden hose 56 which otherwise would hang down in a disorderly manner from the supportive frame means 54 when it is hanging as per FIG. 5, i.e., assembled onto the associated support mounting pin 60.

Ease of mounting the rack 52 to the hanging position of FIG. 5, and ease of removal therefrom even though providing retention against accidental removal or falling, is provided as shown in FIGS. 5 and 7. That is, a latching retainer member such as a finger or yoke 80 is pinned by horizontal pin 82 to the outer end 84 of the shaft or support pin 60; and the shaft 60 in that region is recessed as at 86 to receive the yoke 80, when disposed axially of the shaft 60, such that the tube 58 will freely pass thereover, in a direction of mounting, and thus in mounting the rack 52 on the pin or shaft 60, the tube 58 automatically pushes the latching member 80 to the freely-passing or horizontal position of FIG. 7.

The shaft 60 is long enough that after the tube 58 passes the yoke 80, the yoke 80 drops (as per FIG. 5) to a vertically-hanging position. An inwardly-facing recess wall 88 of recess 86 blocks outward swinging of the yoke 80, preventing inadvertent dismounting of the rack 52 from the shaft 60; for rack-removal requires the user to conciously push the yoke 80 inwardly to a horizontal position (FIG. 7) to release the rack-frame 54 for removal from the mounting pin 60.

SUMMARY

It is thus seen that a cabinet enclosure provides an advantageous storage enclosure for a lawn device, and a garden hose storage rack provides an advantageous device, all separately and in an advantageous combination, according to the inventive concepts.

Accordingly, it will thus be seen from the foregoing description of the invention according to this illustrative embodiment of both devices, separately and in combination, considered with the accompanying drawings, that the present invention provides new and useful concepts, and utility from various standpoints such as pointed out herein, yielding desired advantages and characteristics and accomplishing the intended objects, including those hereinbefore pointed out and others which are inherent in the invention.

Modifications and variations may be effective without departing from the scope of the novel concepts of the invention; accordingly, the invention is not limited to the specific embodiment or form or arrangement of parts herein described or shown.

I claim:

1. An enclosure cabinet for enclosing a lawn mower whose components include ground-engaging wheels, cutting means, and power means, and the lawn mower also has a handle which extends upwardly and rearwardly of the lawn mower, the cabinet comprising:

a pair of side walls, a rear wall which interconnects the rear end portions of the side walls, and a cover means which extends between the side walls and extends forwardly from the rear wall to front end portions of the side walls, the front end portions of the side walls having an opening therebetween, and permitting ingress and egress of the said lawn mower components through the opening between the side walls for storage, a handle cover for shielding the handle of the lawn mower, the handle cover extending transversely of the cabinet at least substantially as far as the spacing of the side walls and at least substantially as far as the length of the opening between the side walls, and support means which support the handle cover from the enclosure cabinet in a position extending upwardly and forwardly therefrom although upwardly and rearwardly of the lawn mower, said support means being wholly supported by the enclosure cabinet and supporting the handle cover in the absense of any leg means extending downwardly from a forward portion of the handle cover for support thereof from the ground.

the arrangement of the enclosure cabinet and the handle cover providing a shielding enclosure for the lawn mower's said components and handle, while the handle is operatively assembled to the mower having its said set of components.

2. The invention as set forth in claim 1, in which said support means includes a pivotal connection which is supported by the cabinet and provides movable support for the handle cover such that the handle cover is sufficiently movable with respect to the said enclosure cabinet that the user may move the handle cover relatively upwardly of the lawn mower handle with the lawn mower positioned fully into the enclosure cabinet and with the handle cover then resting on the lawn mower handle.

3. The invention as set forth in claim 2, in which there are also provided an ancillary storage compartment means supportable on the said enclosure cabinet.

4. The invention as set forth in claim 1, in which there are also provided an ancillary storage compartment means supportable on the said enclosure cabinet.

5. The invention as set forth in claim 1, in which there is provided a base panel means, and the side walls and the rear wall are supported on the base panel means.

6. The invention as set forth in claim 5, in which the base panel means is provided as a generally horizontal panel, with a supporting flange extending peripherally along the edge thereof, providing that when the device is resting on the ground its said supporting flange will engage the ground and hold the base panel means above the ground.

7. The invention as set forth in claim 5, in which vent openings are provided in the said enclosure cabinet.

8. An enclosure cabinet for a mobile lawn-care device whose components include ground-engaging members and power means, the mobile lawn-care device also having a control handle which extends upwardly and rearwardly from the lawn-care device, the enclosure cabinet comprising:

a pair of side walls, a rear wall which interconnects the rear end portions of the side walls, and a cover means which extends between the side walls and extends forwardly from the rear wall to front end portions of the side walls, the front end portions of the side walls having an opening therebetween, and permitting ingress and egress of the said ground-engaging members and power means components through the opening between the side walls for storage, a handle cover for shielding the handle of the device, the handle cover extending transversely of the cabinet at least substantially as far as the spacing of the side walls and at least substantially as far as the length of the opening between the side walls, and support means which support the handle cover from the enclosure cabinet in a position extending upwardly and forwardly therefrom although upwardly and rearwardly of the lawn-care device, said support means being wholly supported by the enclosure cabinet and supporting the handle cover in the absence of any leg means extending downwardly from a forward portion of the handle cover for support thereof from the ground, the arrangement of the enclosure cabinet and the handle cover providing a shielding enclosure for the device's said ground-engaging members and power means components and handle while the handle is operatively assembled to the lawn-care device having its said set of components.

9. The invention as set forth in claim 8, in which said support means includes a pivotal connection which is supported by the cabinet and provides movable support for the handle cover such that the handle cover is sufficiently movable with respect to the said enclosure cabinet that the user may move the handle cover relatively upwardly of the lawn-care device handle with the lawn-care device positioned fully into the enclosure cabinet and with the handle cover then resting on the lawn-care device handle.

10. The invention as set forth in claim 8, in which the lawn-care device is a snow blower.

* * * * *